United States Patent [19]

Hadaway et al.

[11] Patent Number: 5,524,514
[45] Date of Patent: Jun. 11, 1996

[54] COMPUTER NUMERICALLY CONTROLLED TABLE SAW FENCE

[76] Inventors: Jeffrey P. Hadaway, P.O. Box 50, Curtin, Oreg. 97428; Timothy C. Whitford, 800 Milltown Hill La., Yoncolla, Oreg. 97499

[21] Appl. No.: 186,582

[22] Filed: Jan. 26, 1994

[51] Int. Cl.⁶ .................... B23Q 3/00; B26D 5/20
[52] U.S. Cl. .................... 83/76.9; 83/467.1; 269/303; 269/304; 269/307; 269/320
[58] Field of Search .................... 269/303–306, 269/307, 315, 320, 909, 329, 285, 244, 222, 26; 83/75.5, 76.8, 76.9, 422, 520, 467.1, 468, 468.2, 363

[56] References Cited

U.S. PATENT DOCUMENTS

| | | | |
|---|---|---|---|
| 3,973,764 | 8/1976 | Holzer | 269/26 |
| 4,194,267 | 3/1980 | Johnson et al. | 83/363 |
| 4,945,797 | 8/1990 | Hahn | 83/75.5 |
| 4,968,011 | 11/1990 | Womack | 269/244 |
| 5,251,142 | 10/1993 | Cramer | 83/75.5 |
| 5,301,934 | 4/1994 | Lynn et al. | 269/222 |

*Primary Examiner*—Robert C. Watson
*Attorney, Agent, or Firm*—Tod R. Nissle

[57] ABSTRACT

A table saw includes a table, a saw mounted on the table, a carriage mounted on the table, a fence attached to the carriage and extending over the table, and a motor for moving the carriage and fence between at least two operative positions. The motor is actuated by a computer. A keypad mounted on the fence is used to input data to the computer to actuate the motor.

2 Claims, 4 Drawing Sheets

COMPUTER NUMERICALLY CONTROLLED TABLE SAW FENCE

FIELD OF THE INVENTION

The invention generally pertains to the table saw, and more specifically, to the fence and its ability to change positions.

DESCRIPTION OF RELATED ART

Fences on traditional "stationary" table saws depend on manual movement and on physical clamping in order to position and reposition a measurement. This in turn relies heavily on human visual accuracy.

Current automated fence systems do not work with stationary table saws, but instead, are components or add-ons to "sliding" table saws. As such, current automated fence systems cannot be retrofitted onto traditional stationary table saws.

Current automated fence systems for sliding table saws also involve a computer, whereas the current application utilizes a simpler dedicated computer chip with keypad.

A further difference is that current automated fence systems use a "stepping" or "ladder" system on the outside of a rail to find and hold a position for the fence, whereas the current application utilizes an enclosed (dust free) turning thread system within the rail.

SUMMARY OF THE INVENTION

To avoid the limitations and problems with present devices the invention uses a keypad with computer chip, attached to a motor, and mechanical as opposed to human movement, to allow a faster and more accurate setting of distance between the fence and saw blade.

The unit is separate from the table, and can be retrofitted onto standard stationary table saws.

The invention utilizes a novel automated system whereby a keypad attached to the fence sits atop a microcontroller which tells the stepper motor (or "servo" motor) the desired distance to move along a rail. The microcontroller is a dedicated unit with a computer chip. The carriage moves the fence along the table saw surface. The fence movement is accomplished along a rail by a motor attached to an enclosed, dust free, threaded rod, turned a certain number of revolutions by the operator's entry on the keypad.

A BRIEF DESCRIPTION OF THE DRAWINGS

FIG. 1: View of complete fence and rail system mounted on a standard stationary table saw.

FIG. 2: An enlarged view of the components contained in the rail section of the invention.

FIG. 3: A section view of the rail system.

FIG. 4: Carriage with acentric mounted wheels.

DESCRIPTION OF THE PREFERRED EMBODIMENT

Figure 1:
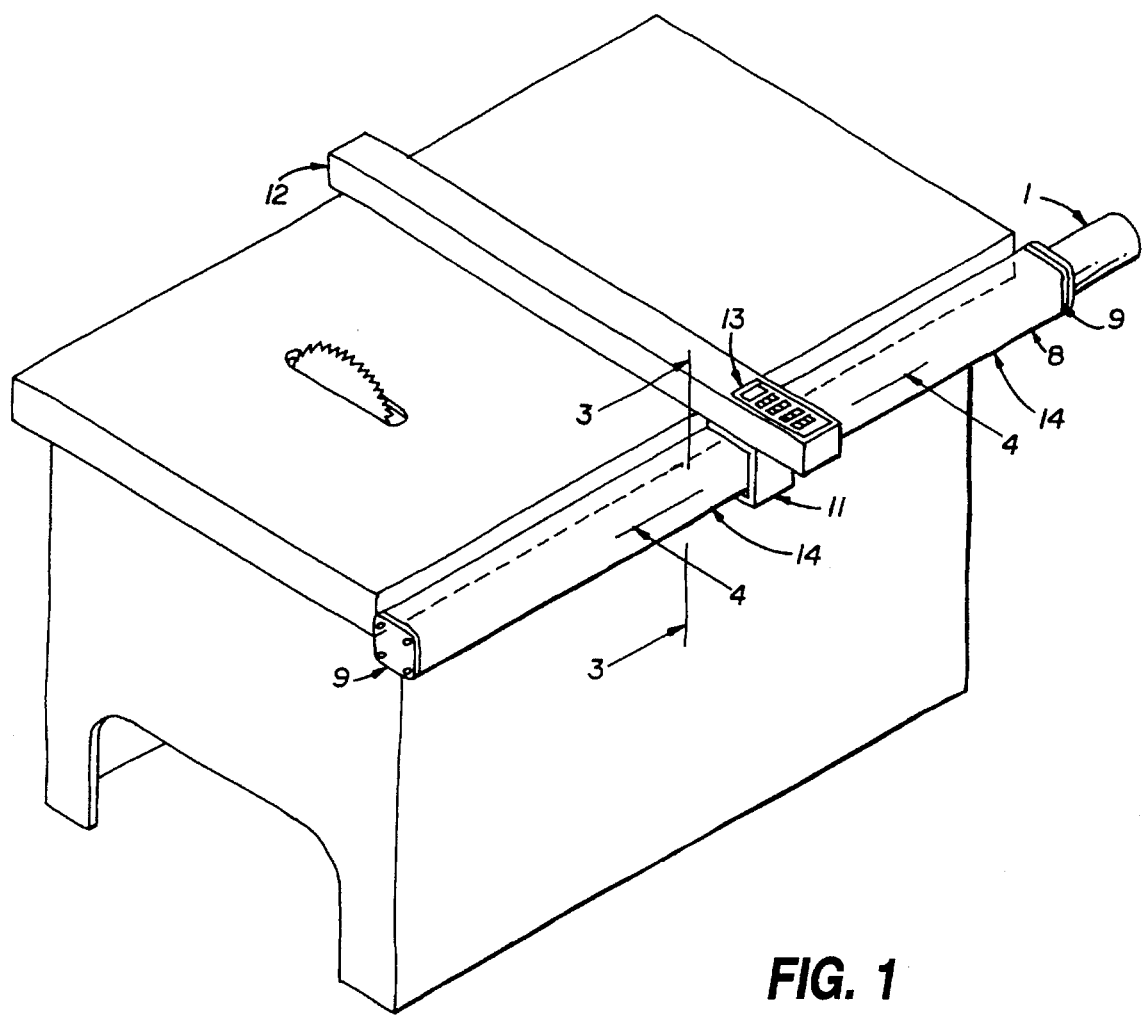
Figure 2:
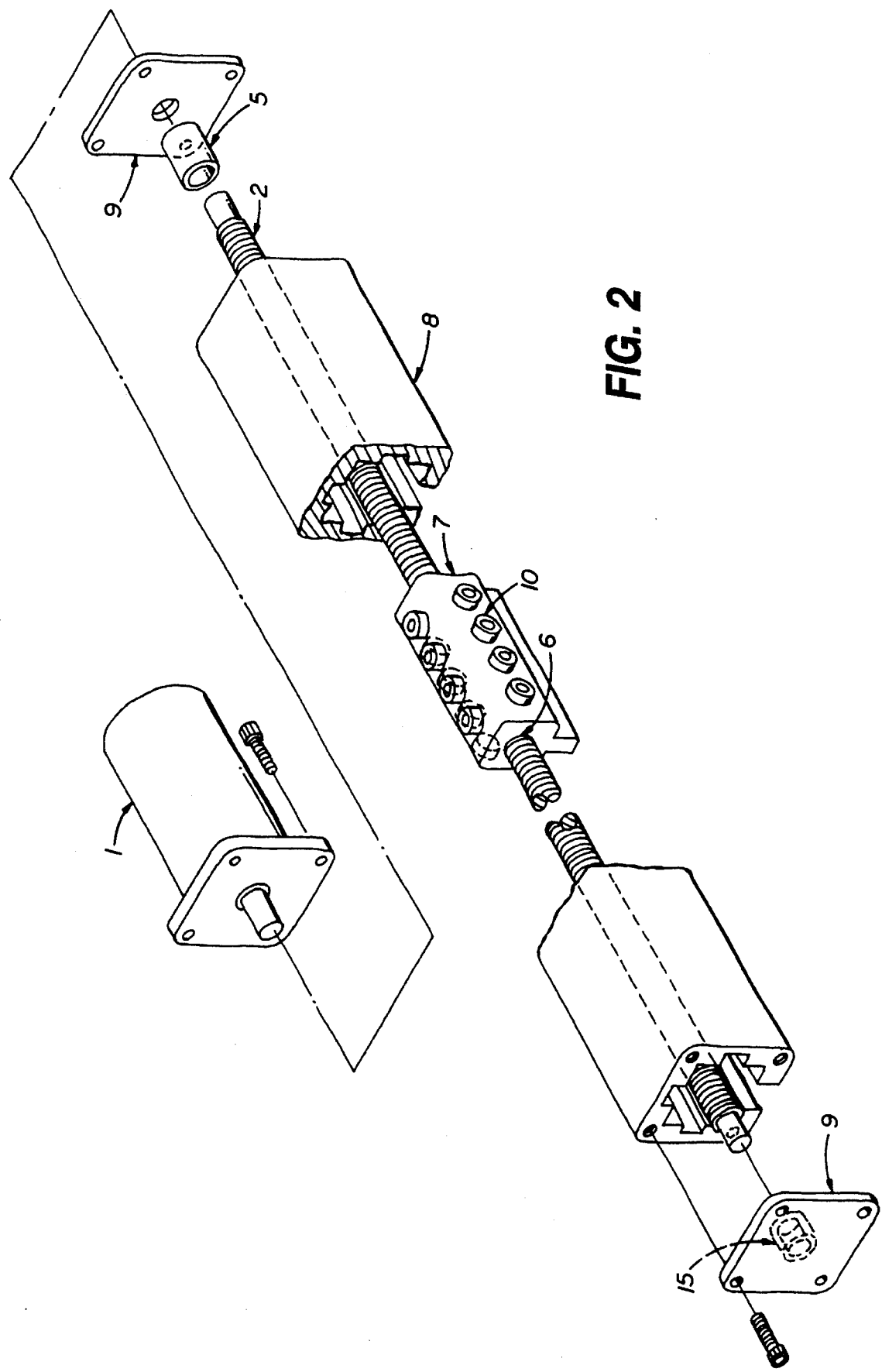
Figure 3:
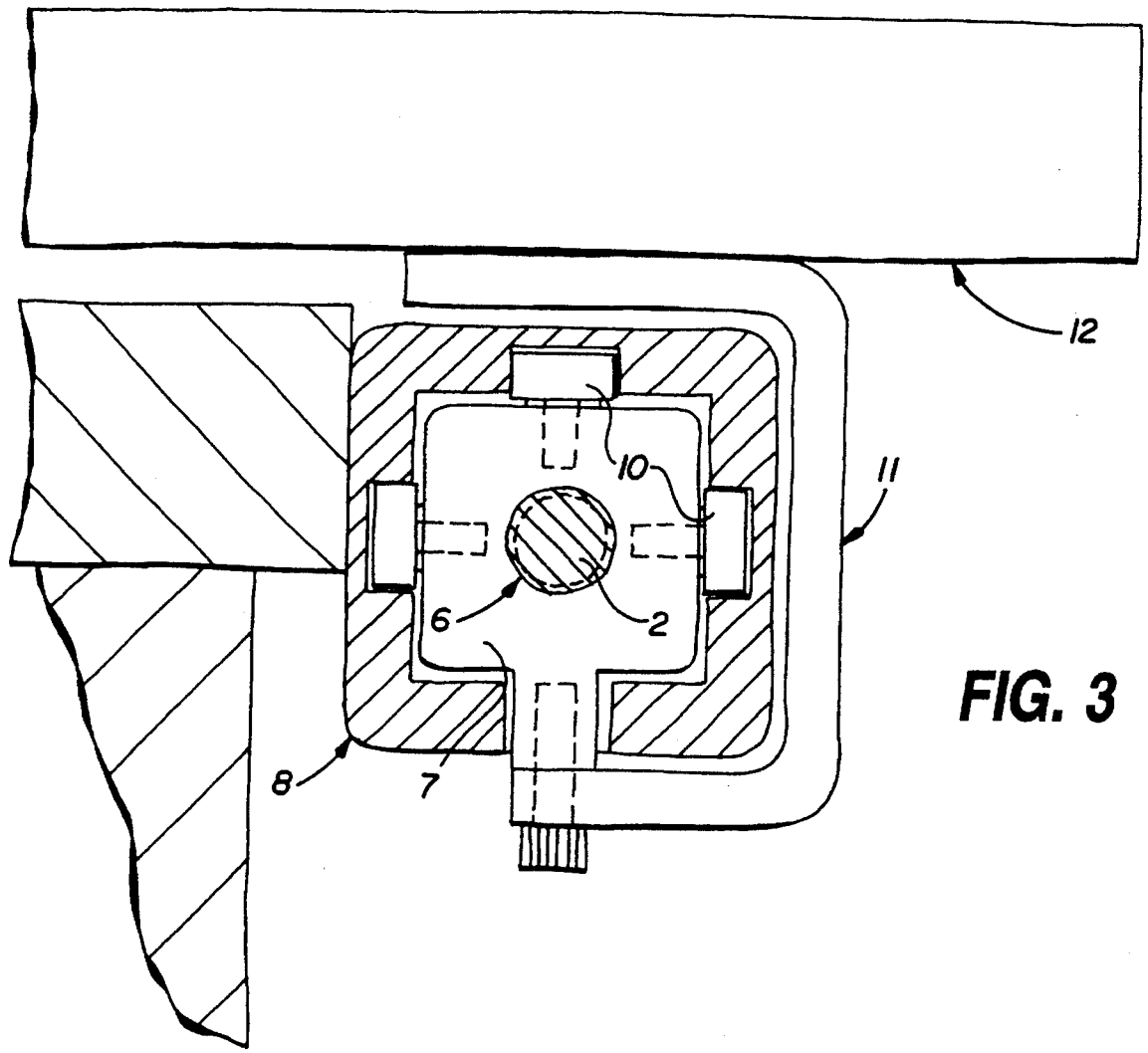
Figure 4:
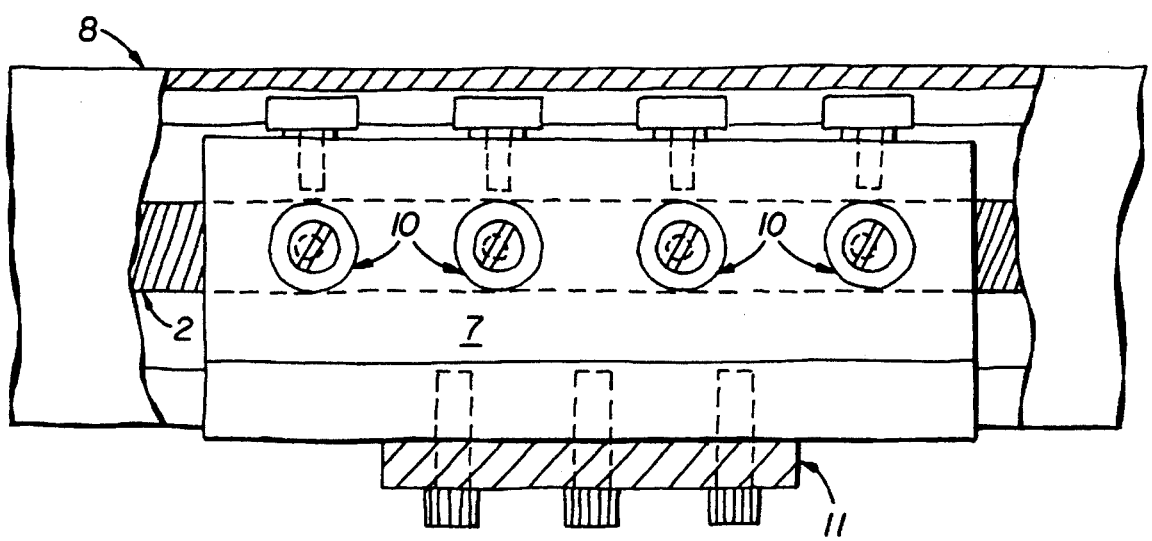

Employing the technology of computer numerically controlled (CNC) and linear motion we have developed an automated fence measuring system for the standard table saw. Speed and accuracy are essential in production and this system exceeds the manual systems now in use.

The invention can be produced at 1/10 the cost of so-called "computerized" fences on sliding table saws.

The invention is an "add on" for a traditional stationary table saw, and can be retrofitted onto such existing table saws.

The invention is suitable for making small cuts, while the currently available sliding table saws with automated fences are only economical for cutting large panels.

To begin, an operator enters the desired measurement on the keypad, then touches the "move" button and the fence automatically moves to that position. After making the cut or cuts, the operator can then repeat the process with another measurement entry. By the time the operator has picked up the next piece to be cut, the fence is in position and waiting. Clamping the fence manually is not necessary due to the gearing and holding force of the motor.

The motor (1) coupled to a threaded rod (2) with an anti-backlash coupler (5) moves a bearing (6) attached to a carriage (7) that moves inside an enclosed, dust free, rail (8). The threaded rod is mounted at each end of the rail with a bearing (15) mounted to an end cap (9). The right side end cap also provides a means of mounting the motor. The carriage is guided through the rail by wheels (10) allowing left and right movement only. A bracket (11) is mounted to the carriage and fashioned to also mount the fence. A keypad is wired to a microcontroller, a motor drive, and a power supply (13). Also provided are limit switches (14) to control maximum movement of the fence (12) left and right, to keep the fence from contacting the saw blade or motor.

The rail is attached to the front edge of the table saw top, replacing the old rails and fence. A full table extension is required to the right to support the fence at the rear.

The threaded rod drive system could be changed to a belt drive system using gear pulleys at each end cap.

This system could serve better in a radial arm saw fence system where the stop function has a longer distance to travel. A threaded rod is limited to its span of unsupported distance. This same motion control will adapt to related needs of measurement such as with a radial arm saw.

The keypad location is variable, and could also be fixed, for example, to the table saw's base, or on an attached or detached arm.

Although the invention is described with respect to a preferred embodiment, modifications thereto will be apparent to those skilled in the art. Therefore, the scope of the invention is to be determined by reference to the claims which follow.

We claim:

1. A table saw including
   (a) a table;
   (b) a saw mounted on said table;
   (c) carriage means mounted on said table;
   (d) a fence attached to said carriage means and extending over said table;
   (e) motor means operatively connected to said carriage means to simultaneously move said carriage means and said fence between at least first and second operative positions;
   (f) a computer to actuate said motor means to move said carriage and said fence between said operative positions; and,
   (g) a keypad mounted on said fence to input data to said computer for actuating said motor means to move said carriage and said fence, said keypad moving simultaneously with said fence.

2. The table saw of claim 1 wherein said carriage means includes
(a) elongate rod means operatively associated with said motor means;
(b) a carriage attached to said rod means for movement therealong between said operative positions;
(c) a housing extending over said rod means and said carriage and including a solid top and a bottom and an opening formed said bottom, said rod means and said carriage being inside housing intermediate said top and said bottom; and,
(d) a bracket interconnecting said carriage and said fence, said bracket extending from over said top of said housing, around a portion of said housing, and through said opening said carriage.

* * * * *